US012327474B1

(12) United States Patent
Dammers

(10) Patent No.: US 12,327,474 B1
(45) Date of Patent: Jun. 10, 2025

(54) TRAFFIC WARNING SYSTEM FOR DETECTING AND WARNING OF BICYCLE TRAFFIC

(71) Applicant: Marc Dammers, Henderson, NV (US)

(72) Inventor: Marc Dammers, Henderson, NV (US)

( * ) Notice: Subject to any disclaimer, the term of this patent is extended or adjusted under 35 U.S.C. 154(b) by 44 days.

(21) Appl. No.: 18/367,541

(22) Filed: Sep. 13, 2023

Related U.S. Application Data

(60) Provisional application No. 63/406,044, filed on Sep. 13, 2022.

(51) Int. Cl.
*G08G 1/095* (2006.01)
*G08G 1/01* (2006.01)
*G08G 1/017* (2006.01)

(52) U.S. Cl.
CPC ........... *G08G 1/095* (2013.01); *G08G 1/0137* (2013.01)

(58) Field of Classification Search
None
See application file for complete search history.

(56) References Cited

U.S. PATENT DOCUMENTS

| | | | |
|---|---|---|---|
| 7,018,131 B2 | 3/2006 | Jordan | |
| 10,490,065 B2 | 11/2019 | Wong et al. | |
| 2005/0238425 A1 | 10/2005 | Safar | |
| 2009/0256723 A1* | 10/2009 | Peddie | G08G 1/096783 340/907 |
| 2011/0298603 A1* | 12/2011 | King | G08G 1/042 340/436 |
| 2013/0113618 A1* | 5/2013 | Flanagan | E01F 9/559 340/539.1 |
| 2018/0253964 A1* | 9/2018 | Wong | G08G 1/0141 |
| 2022/0172607 A1* | 6/2022 | Guan | G08G 1/052 |

* cited by examiner

*Primary Examiner* — John F Mortell
(74) *Attorney, Agent, or Firm* — Plager Schack LLP; Mark H. Plager; Naomi Mann

(57) ABSTRACT

A traffic warning system provides a motion activated warning device that is mounted to the surface of a road and is configured to generate a visual signal upon detection of bicycle and/or slow-moving traffic to warn oncoming traffic.

10 Claims, 4 Drawing Sheets

TRAFFIC WARNING SYSTEM FOR DETECTING AND WARNING OF BICYCLE TRAFFIC

RELATED APPLICATION

This application claims benefit to U.S. Application No. 63/406,044 filed on Sep. 13, 2022, which is incorporated by reference herein in its entirety.

BACKGROUND

The present disclosure relates generally to devices and systems for traffic safety.

Slow moving traffic, including bicyclists, may cause a safety hazard to themselves and other vehicles, as faster moving traffic may not have sufficient time to slow down to avoid collision, or may be forced to abruptly brake. As such, there is a need for an improved system that provides warning to oncoming traffic of slower moving and/or bicycle traffic ahead.

SUMMARY

Disclosed is a traffic warning system for detecting and warning of bicycle traffic, which may comprise providing at least one warning device that includes a motion sensor configured to detect motion indicative of bicycle traffic, and a visual signal indicator configured to generate a visual warning signal upon detection of motion indicative of bicycle traffic. In embodiments, the system may further comprise mounting the warning device on a roadway in an orientation configured to detect motion in a location where the bicycle traffic is expected, and to generate said visual warning signal in a direction towards expected oncoming traffic.

In some embodiments, the warning device is mounted on or proximate a lane divider line that separates between a vehicle lane and a bicycle lane, the warning device being oriented to detect cyclists within the bicycle lane. In some embodiments, motion indicative of bicycle traffic comprises slow moving traffic; however, any traffic detected in the bicycle lane may serve as an indication of bicycle traffic. In some embodiments, the visual warning signal comprises a flashing light and/or a continuous illumination. In certain embodiments, the visual warning signal has a limited time duration. In some embodiments, the warning device comprises a housing supporting the visual signal indicator and said motion sensor, the housing further protectively encloses an energy storage element, and circuitry. In some embodiments, a signal indicator port of the visual signal indicator and a motion sensor port of the motion sensor are integrated into the surface walls of housing. In certain embodiments, the warning device further comprises a solar panel integrated into the surface walls of the housing and configured to supply power to the energy storage element. In certain embodiments, the housing has a rectangular cross section. In some embodiments, the housing has front, back, left-side, and right side surface walls which are angled inwards and trapezoidally shaped. In certain embodiments, the signal indicator port and the motion sensor port are provided on adjacent surface walls of the housing, the signal indicator port being on a front surface wall, and the motion sensor port being on a side surface wall, wherein the front surface wall is shorter than the side surface wall. In some embodiments, the warning device is configured to operate autonomously.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
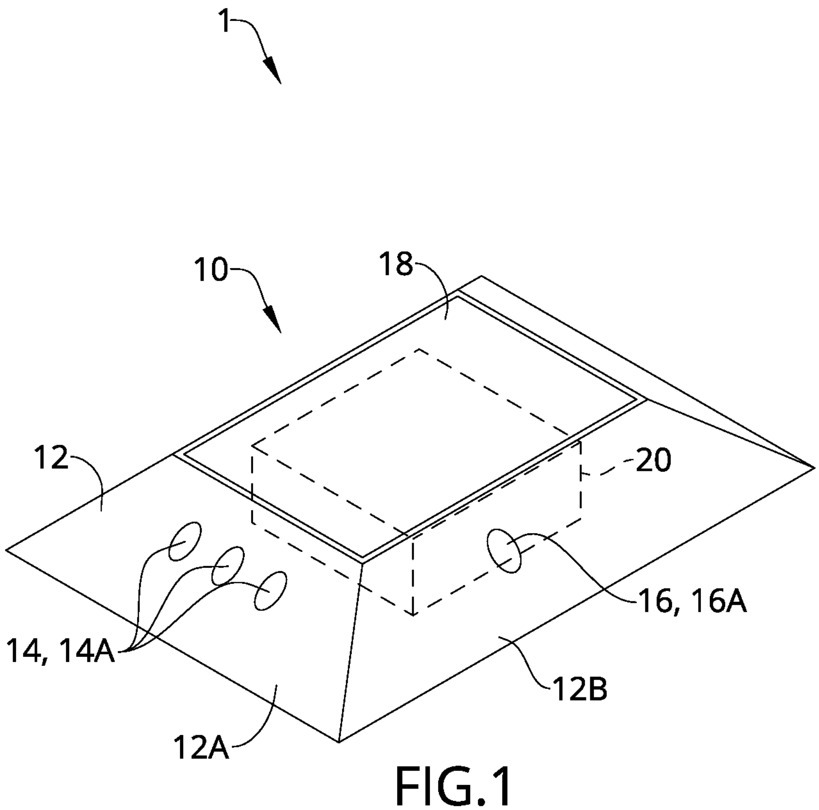
FIG. 1 is a perspective view of a warning device for a traffic warning system, according to various embodiments.
Figure 2:
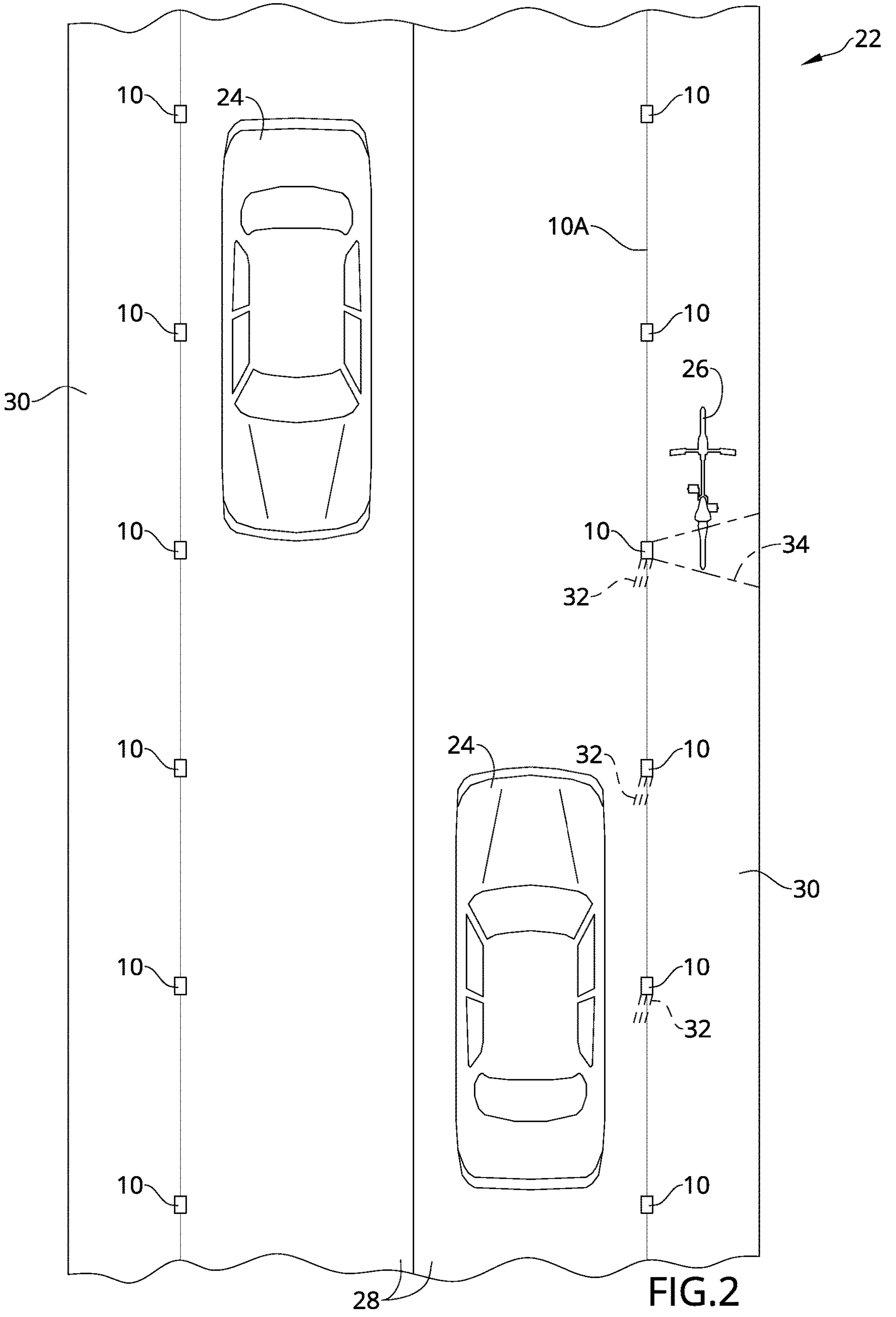
FIG. 2 illustrates a traffic warning system, comprising multiple warning devices implanted for use.
Figure 3:
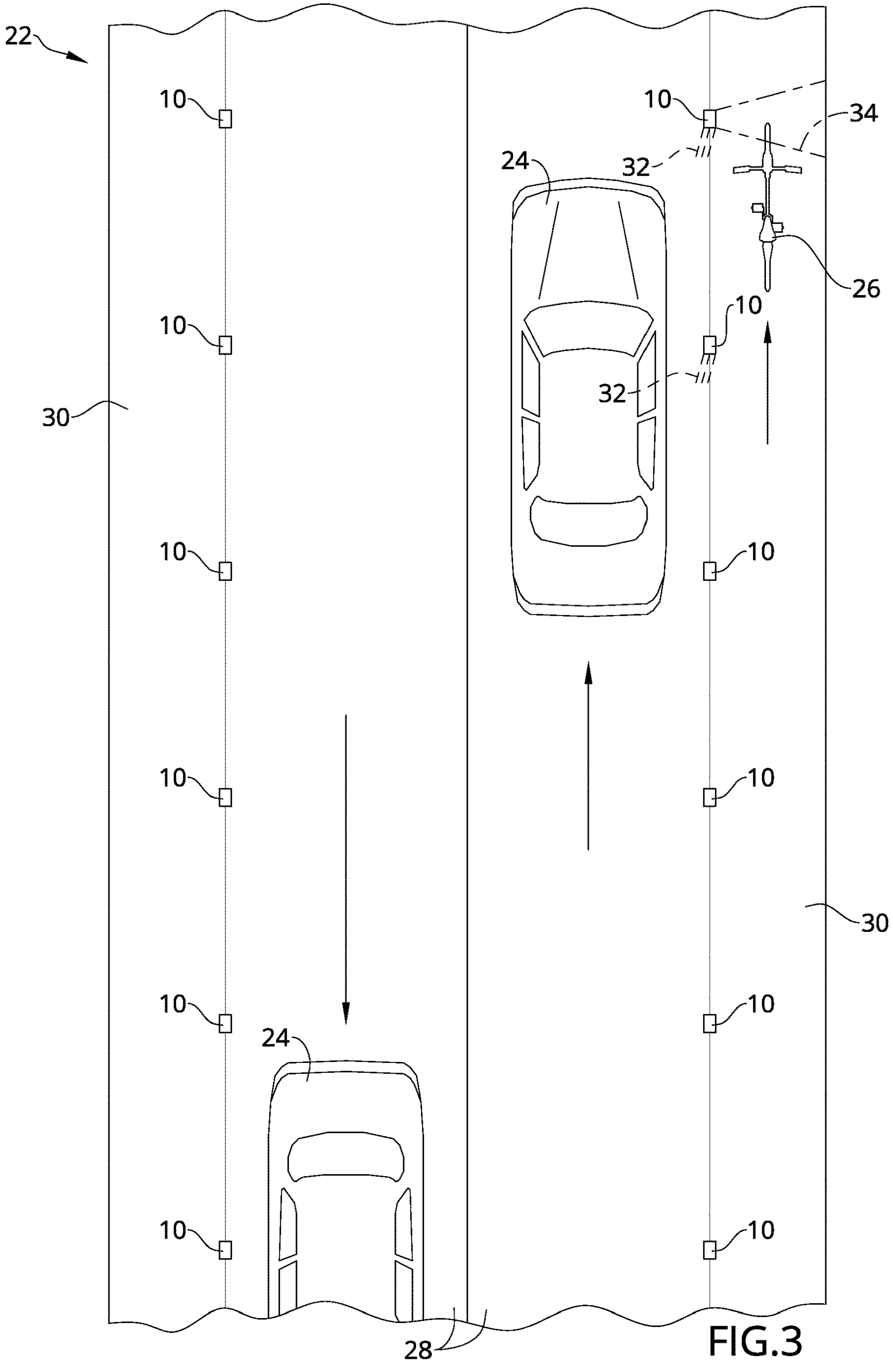
FIG. 3 depicts moving traffic within the traffic warning system.
Figure 4:
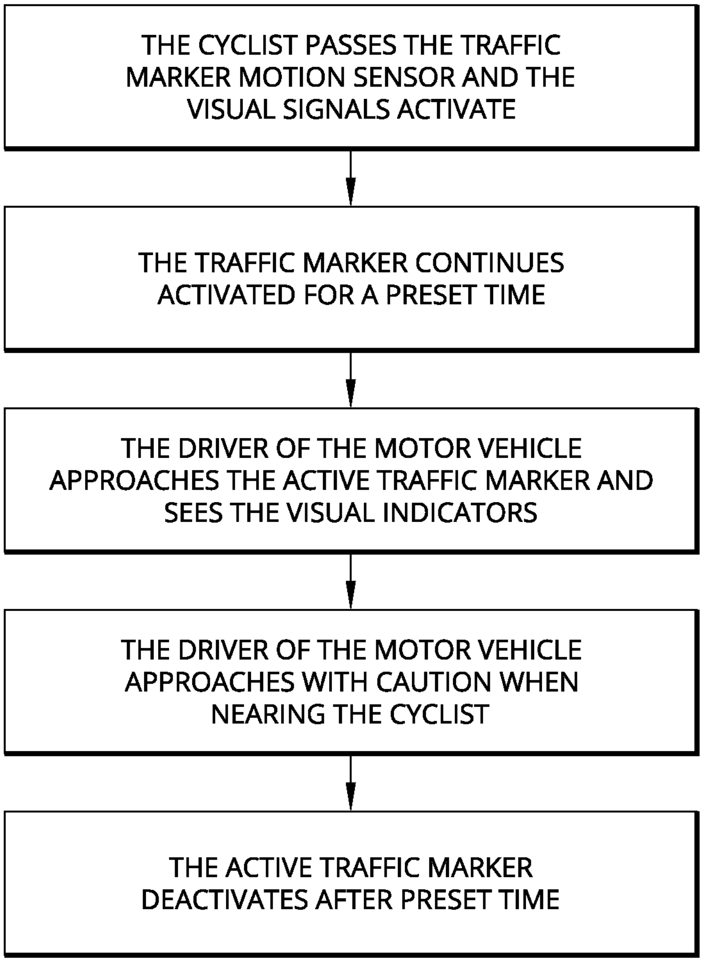
FIG. 4 is a flow chart for the traffic warning system.

According to various embodiments as depicted in FIGS. 1-4, disclosed is a traffic warning system 1 comprising at least one motion activated warning device 10 configured to detect slow moving and/or bicycle traffic and warn oncoming traffic. In certain embodiments, warning device 10 may be mounted to the surface of a roadway 22, and is configured to emit a visual signal 32, i.e., light warning, upon detection of slow traffic (e.g., less than about 20 mph, or less than about 18 mph, or less than about 16 mph) and/or traffic in a certain location such as a bicycle lane 30 specifically designated for cyclists 26. In further embodiments, device 10 may be a self-powered, stand-alone unit, that is easily installable. In some further embodiments, device 10 operates autonomously, and is not interdependent on the operation of other devices.

In certain embodiments, warning device 10 may be implemented around any traffic lane, including motor vehicle lane(s) 28, and bicycle lane(s) 30. In one embodiment, device 10 may be place between vehicle lane 28 and bicycle lane 30, on or proximate the lane divider line 10A, and is configured to detect cyclists 26 within a motion sensing area 34 in bicycle lane 30, whereupon visual signal 32 is emitted to warn the driver(s) of all oncoming motor vehicle(s) 24 in adjacent vehicle lane 28 to take precaution. In one embodiment, visual signal 32 may comprise a flashing light or continuous illumination, which may last for several seconds upon the detection of motion (e.g., less than about 10 seconds, or for about 5 to 10 seconds).

In embodiments, warning device 10 may comprise an enclosure or housing 12, at least one visual signal indicator 14, at least one motion sensor 16, and an energy storage element (e.g., battery and/or capacitor) and circuitry 20 for powering and operating signal indicator 14 and motion sensor 16. In some embodiments, warning device 10 may further comprise a solar panel 18 configured to supply power to the energy storage element. Housing 12 is configured to attach to the surface of road 22 and to withstand motorized vehicle traffic. In certain embodiments, ports 14A, 16A of signal indicator 14 and motion sensor 16, respectively, are integrated into the surface of housing 12, while energy storage element and circuitry 20 are protectively contained within the housing, as shown in the figures. In one embodiment, the motion sensor 16 may be a passive infrared sensor, but not necessarily so. In some embodiments, solar panel 18 may also be integrated into the surface of housing 12, making warning device 10 a self-powering, self-contained system. It shall be appreciated however, that in alternate embodiments, solar panel 18 may be stationed outside warning device 10 and in proximity thereto.

In certain embodiments, housing 12 may be glued or otherwise bonded to the surface of the asphalt of road 22. In other embodiments, housing 12 may be embedded within the asphalt. In some embodiments, housing 12 may have a rectangular cross section. In further embodiments, housing 12 may have inwardly angled trapezoidal walls as shown in the figures. Additionally, signal indicator port 14A and motion sensor port 16A may be positioned on adjacent walls of housing 12, with indicator port 14A preferably on the shorter front wall 12A (facing oncoming traffic) and sensor port 16A on the longer side wall 12B (facing the cyclist lane), as shown. This configuration enables warning device 10 to be positioned with its long axis on or proximate lane divider line 10A with motion sensing area 34 generated in cyclist lane 30, and visual signal 32 directed towards oncoming traffic. The rectangular cross section further allows the long axis of housing 12 to run parallel to divider line 10A to minimize or eliminate intrusion into motor vehicle lane 28 and bicycle lane 30. Additionally, the top and back walls of the housing may be used for mounting solar panel 18 and/or for providing a reflective surface. In some embodiments, the side wall opposite wall 12B may include a second senor port, a second signal indicator port 14A, a solar panel 18, and/or a reflective surface.

It shall be appreciated that warning device 10 may have different design configurations in alternate embodiments. For example, in some embodiments, the surface walls of housing 12 and/or sections thereof may be made of a transparent material which may be colored, and signal indicator 14 may be configured to generate light within the device that may appear through the transparent walls. In some embodiments, the surface walls of housing 12 and/or sections thereof may be made of a reflective material for added visibility at nighttime. In certain embodiments, the motion sensor may be configured to detect motion to the right, left, front, back, and/or over the device.

In certain embodiments, warning device 10 may be configured to operate continuously. In certain embodiments, warning device 10 may be configured to operate during nighttime and/or evening hours only, when visibility is particularly low, and/or in order to conserve energy. In further embodiments, the operation of warning device 10 may take into account factors such as traffic conditions, weather conditions, time of day, time of year, etc.

In embodiments, system 1 may comprise one or more of warning device 10, which may be placed at any needed location(s). In operation, the device circuitry including any necessary processing/computing elements causes motion to be detected by the motion sensor and the visual signal indicator to flash and/or light up. In some embodiments, warning device 10 may be configured to generate visual signal 32 upon detection of any motion in cyclist lane 30. In other embodiments, warning device 10 may be configured to generate visual signal 32 upon detection of motion under a threshold speed in cyclist lane 30 and/or in other locations. As such, the disclosed subject matter provides a warning system which provides fast-approaching traffic enough time to be alerted and take action if needed.

It shall be appreciated that the disclosed device and system may be used for other situations where motion detection may be required. For example, one or more of device 10 may be used in an area where children may be at play.

It shall be appreciated that the disclosed warning device and system can have multiple configurations in different embodiments. It shall be appreciated that the components of the warning device described herein may comprise any alternative known materials in the field and be of any size and/or dimensions. In one embodiment, the device may have a trapezoidal housing, with a rectangular or square top as shown in the figures. However, different geometric configurations and sizes may be used in alternate embodiments. It shall be appreciated that the components of the warning device described herein may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A traffic warning system for detecting and warning of bicycle traffic, comprising:

mounting at least one warning device on a roadway, the warning device comprising: a motion sensor configured to detect motion indicative of bicycle traffic, and a visual signal indicator configured to generate a visual warning signal upon detection of said motion indicative of bicycle traffic by said motion sensor, the warning device being mounted in a location and in an orientation configured to detect bicycle traffic, and to generate said visual warning signal in a direction towards oncoming motor vehicle traffic upon detection of said motion indicative bicycle traffic, wherein the generated visual warning signal has a preset time duration, wherein the warning device comprises housing which supports said visual signal indicator and said motion sensor, the housing further protectively enclosing an energy storage element, and circuitry, wherein the warning device is a self-contained and standalone unit that operates autonomously, and is not interdependent on the operation of other remotely located devices for generating said visual warning signal.

2. The traffic warning system of claim 1, wherein the warning device is mounted on or proximate a lane divider line that separates between a vehicle lane and a bicycle lane, the warning device being oriented to detect cyclists within the bicycle lane.

3. The traffic warning system of claim 1, wherein motion indicative of bicycle traffic comprises slow moving traffic.

4. The traffic warning system of claim 1, the visual warning signal comprising a flashing light and/or a continuous illumination.

5. The traffic warning system of claim 1, wherein a signal indicator port of the visual signal indicator and a motion sensor port of the motion sensor are integrated into the surface walls of housing.

6. The traffic warning system of claim 5, the warning device further comprising a solar panel integrated into the surface walls of the housing and configured to supply power to the energy storage element.

7. The traffic warning system of claim 5, wherein the housing has a rectangular cross section.

8. The traffic warning system of claim 7, wherein the housing has front, back, left-side, and right side surface walls which are angled inwards and trapezoidal shaped.

9. The traffic warning system of claim 7, wherein the signal indicator port and the motion sensor port are provided on adjacent surface walls of the housing, the signal indicator port being on a front surface wall, and the motion sensor port being on a side surface wall, wherein the front surface wall is shorter than the side surface wall.

10. The traffic warning system of claim 9, further comprising a solar panel on a top surface wall of the housing.

* * * * *